US012776199B1

(12) United States Patent
Jones, Jr. et al.

(10) Patent No.: US 12,776,199 B1
(45) **Date of Patent: *Oct. 27, 2026**

(54) GEOFENCING WITH SATELLITE SYSTEMS

(71) Applicant: United Services Automobile Association (USAA), San Antonio, TX (US)

(72) Inventors: David M. Jones, Jr., San Antonio, TX (US); Megan S. Jennings, San Antonio, TX (US); Bradly Jay Billman, Celina, TX (US); Sumita T. Jonak, San Antonio, TX (US); Priyadarshini Badugu, Frisco, TX (US); Justin R. Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/973,700

(22) Filed: Dec. 9, 2024

Related U.S. Application Data

(63) Continuation of application No. 18/349,552, filed on Jul. 10, 2023, now Pat. No. 12,183,186, which is a continuation of application No. 17/827,620, filed on May 27, 2022, now Pat. No. 11,790,761.

(51) Int. Cl.
*G08B 25/10* (2006.01)
*G08B 21/18* (2006.01)
*H04B 7/185* (2006.01)
*H04W 4/021* (2018.01)

(52) U.S. Cl.
CPC ............ *G08B 25/10* (2013.01); *G08B 21/18* (2013.01); *H04B 7/18513* (2013.01); *H04W 4/021* (2013.01)

(58) Field of Classification Search
CPC .... G08B 25/10; G08B 21/18; H04B 7/18513; H04W 4/021
See application file for complete search history.

(56) References Cited

U.S. PATENT DOCUMENTS

| | | | | |
|---|---|---|---|---|
| 8,531,293 B2 * | 9/2013 | Putz | G08B 31/00 340/541 |
| 8,779,912 B2 * | 7/2014 | Sverrisson | B60R 25/04 340/426.3 |
| 10,467,885 B2 * | 11/2019 | Trundle | B64U 10/14 |
| 11,790,761 B1 * | 10/2023 | Jones, Jr. | H04B 7/18513 340/539.1 |
| 12,183,186 B1 * | 12/2024 | Jones | H04B 7/18513 |
| 2010/0017126 A1 * | 1/2010 | Holcman | G08B 21/0261 701/300 |
| 2017/0250751 A1 * | 8/2017 | Kargieman | H04B 7/18513 |

* cited by examiner

*Primary Examiner* — John A Tweel, Jr.
(74) *Attorney, Agent, or Firm* — BakerHostetler

(57) ABSTRACT

A system may employ one or more satellite sensors to monitor an area; detect a body or thing that should not be present in an area; formulate a response, such as documentation, notifying authorities, or deploying unmanned aerial vehicles; and execute the response. Monitoring an area can be based on a request for surveillance at the area.

20 Claims, 4 Drawing Sheets

GEOFENCING WITH SATELLITE SYSTEMS

CROSS-REFERENCE TO RELATED APPLICATIONS

This patent application is a Continuation Application and claims priority to and the benefit of U.S. Ser. No. 18/349,552, which was filed on Jul. 10, 2023, which is a Continuation Application and claims priority to and the benefit of U.S. Serial application Ser. No. 17/827,620, filed May 27, 2022, now U.S. Pat. No. 11,790,671, issued Oct. 17, 2023, both of which are incorporated herein by reference in their entirety.

TECHNICAL FIELD

Systems, apparatuses, or methods for geofencing using different systems, such as satellite systems.

BACKGROUND

A geofence is a virtual perimeter for a real-world geographic area. A geofence may be dynamically generated or match a predefined set of boundaries. The use of a geofence is called geofencing, and one example of use involves a location-aware device of a location-based service user entering or exiting a geofence.

SUMMARY

The disclosed subject matter may enable satellite based geofencing. In an example, an apparatus may include a processor and a memory coupled with the processor that effectuates operations. The operations may include receiving an indication for satellite surveillance at a location; based on the indication, determining a first satellite of a plurality of satellites that have the appropriate features and location (e.g., is it at location or nearest to location and capability to move to such location); creating a geofence for the location; sending instructions for the first satellite to monitor the geofence of the location; detecting an unauthorized object within the geofence; and in response to detecting the unauthorized object, sending an alert.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
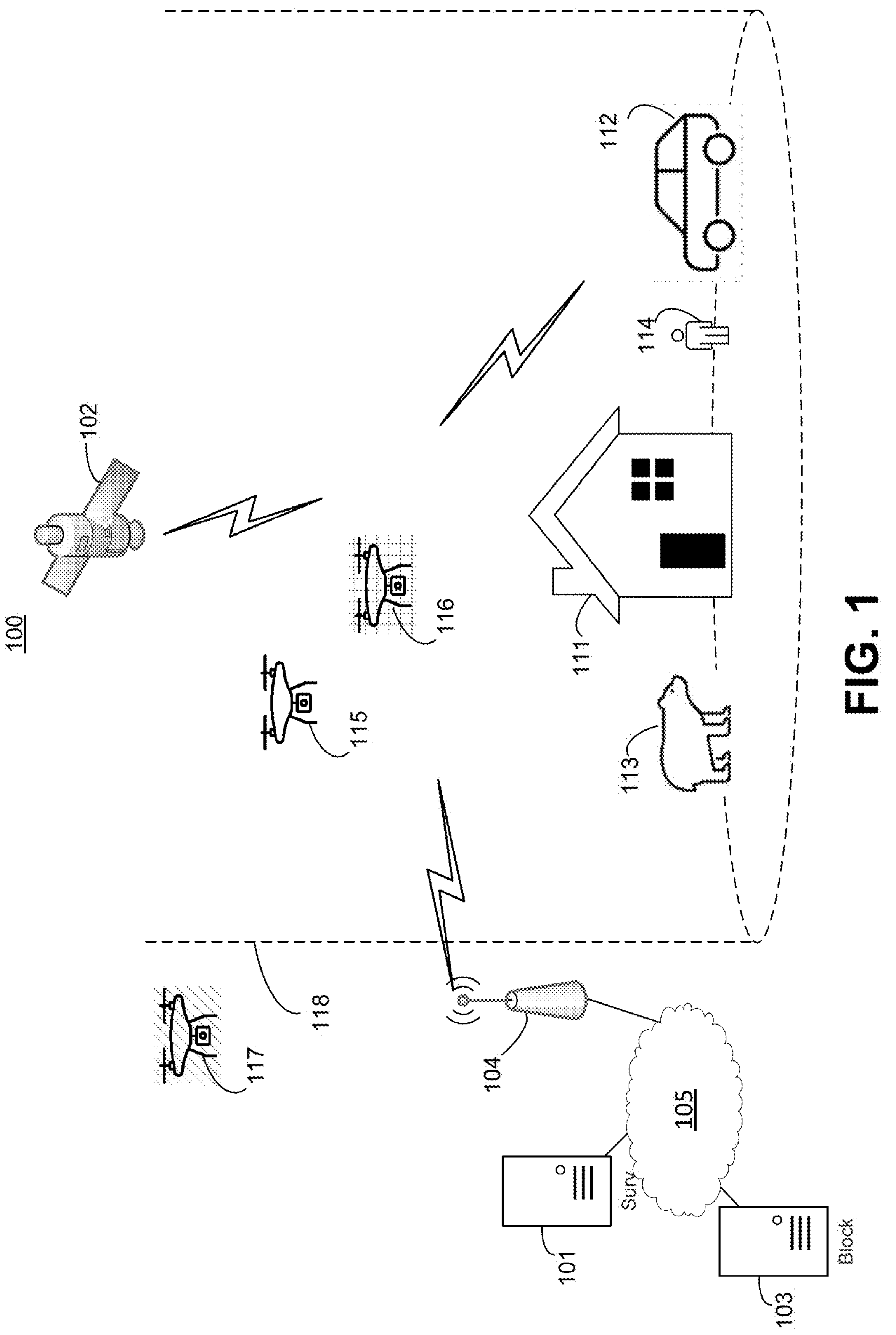
FIG. 1 illustrates an exemplary system that may enabling geofences using satellite systems.

The disclosed subject matter may enable satellite based geofencing. FIG. 1 illustrates an exemplary method that may enable the geofencing system disclosed herein. System 100 may include a plurality of devices, such as vehicle 115, vehicle 116, vehicle 117, vehicle 112, satellite 102, base station 104, surveillance server 101, or block server 103. The devices of system 100 may be communicatively connected with each other and network 105. Base station 104 may communicate via wired or wireless communication with any of the devices of system 100. Satellite 102 may include a plurality of devices, such as an infrared sensors, cameras, communications equipment, or photonics emitters (e.g., devices that emit light), among others. A satellite communication technology may be particularly relevant for locations in a remote area, a disaster hit area, or the like that has no or intermittent connectivity.

The disclosed vehicles may be unmanned or autonomous terrestrial, aerial, nautical, or multi-mode vehicles and as disclosed herein the use of an autonomous vehicle is considered when an unmanned vehicle is disclosed (and vice versa). In an example scenario, vehicle 115, vehicle 116, or vehicle 117 may be unmanned aerial vehicles, while vehicle 112 may be an autonomous terrestrial vehicle (e.g., SAE Intl level 3 to level 5 automation).

With continued reference to FIG. 1, as shown, vehicle 115, vehicle 116, vehicle 112, individual 114, building 111, or bear 113 may be objects within geofence 118. As disclosed herein, surveillance server 101 may be used to obtain information from satellite 102 and process that information to send alerts associated with geofence 118. Block server 103 may send no-go (e.g., no-fly) zone information to vehicles (or other devices). In an example, vehicle 112 may request no-go zone information or may automatically be sent no-go zone information. For example, vehicle 117 may obtain no-go zone information from block server 103 and based on that no-go zone information, vehicle 117 may maneuver around geofence 118 to travel to a destination. It is contemplated that the no-go zone information may be based on only authorizing a certain number or type of listed objects (e.g., vehicles) and all other objects may be considered not authorized.

Figure 2:
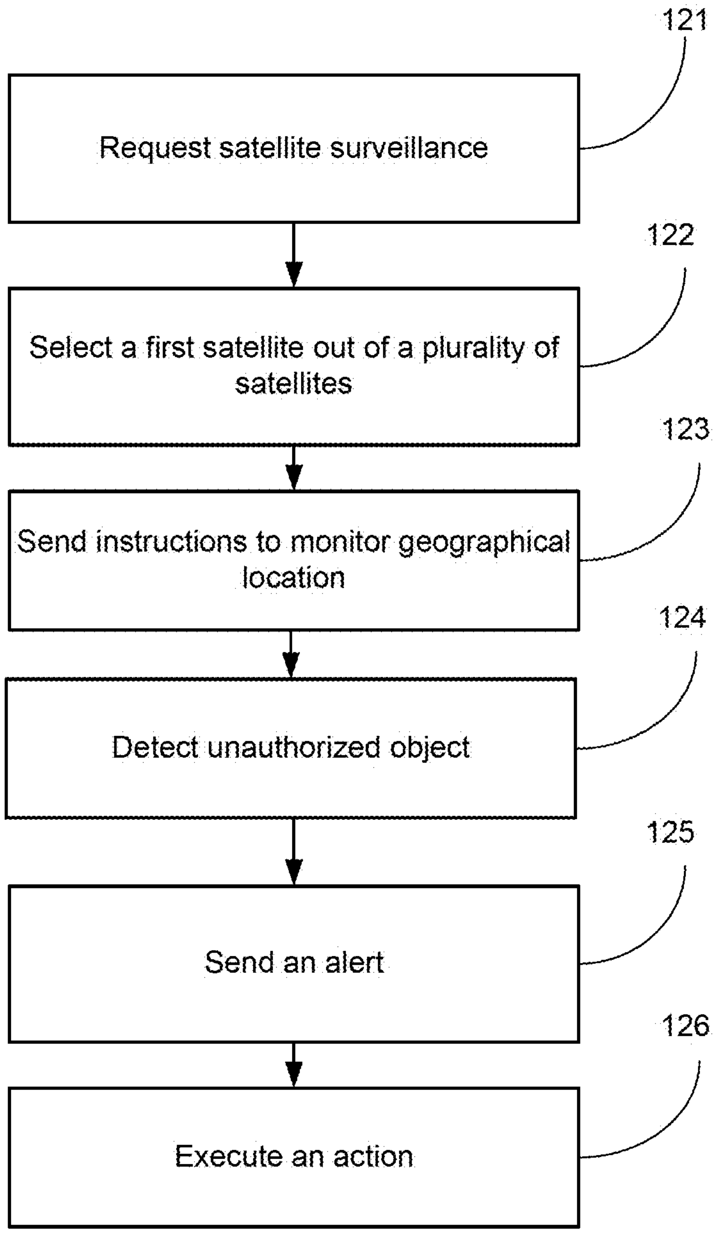
FIG. 2 illustrates an exemplary method that may enabling geofences using satellite systems.

FIG. 2 illustrates an exemplary method that may enable the geofencing system disclosed herein. At step 121, a request for satellite surveillance at a location may be received. The location may be a business, a home, or another area, which may be indicated by coordinates, an address, or the like. The request may be from a mobile device of a user associated with the business, home, or other area. The request may include surveillance related information, such as type of building at the location, type of terrain at the location, list of authorized objects (e.g., persons, animals, or things), list of unauthorized objects, number of objects allowed within geofence (e.g., only 2 vehicles or other objects of a certain type), desired satellite features (e.g., infrared sensors, satellite imaging, computation power, availability, or the like), types of alerts to be sent, or when alerts may be sent, among other things.

At step 122, based on the request of step 121, a first satellite (e.g., satellite 102) of a plurality of satellites may be selected. For example, surveillance server 101 may determine that satellite 102 is the nearest satellite to the location, capable of moving to such location within a time frame, has the sensors for surveilling the location, or the like.

At step 123, instructions may be sent to satellite 102 to monitor geofence 118 at the geographical location. At step 124, an unauthorized object within the geofence 118 may be detected. In an exemplary scenario, vehicle 116, bear 113, individual 114, or vehicle 112 may be considered unauthorized objects that are detected.

At step 125, in response to detecting the unauthorized object near or within geofence 118, an alert may be sent. The alert may be sent to unmanned (or autonomous) vehicles, mobile devices, security systems, or other devices. The devices may be associated with public safety, such as police, fire, animal control, or the like services.

At step 126, in response to the alert, an action may be taken. For example, in response to the alert of step 125, vehicle 115 (an authorized vehicle) may be deployed. Vehicle 115 may be deployed to geofence 118 and may capture video, capture audio, capture nearby signals for analysis, or activate audio/visual alarms, among other things. In another example, vehicle 115 may verify unauthorized objects or change initially indicated unauthorized objects to an authorized object based on further inspection (e.g., a scan of a particular authorized license plate or face may trigger change). In another example action, satellite 102 may emit light that is only visible to an authorized user associated with the geographical location. The light may be seen with augmented reality glasses or another device.

Figure 3:
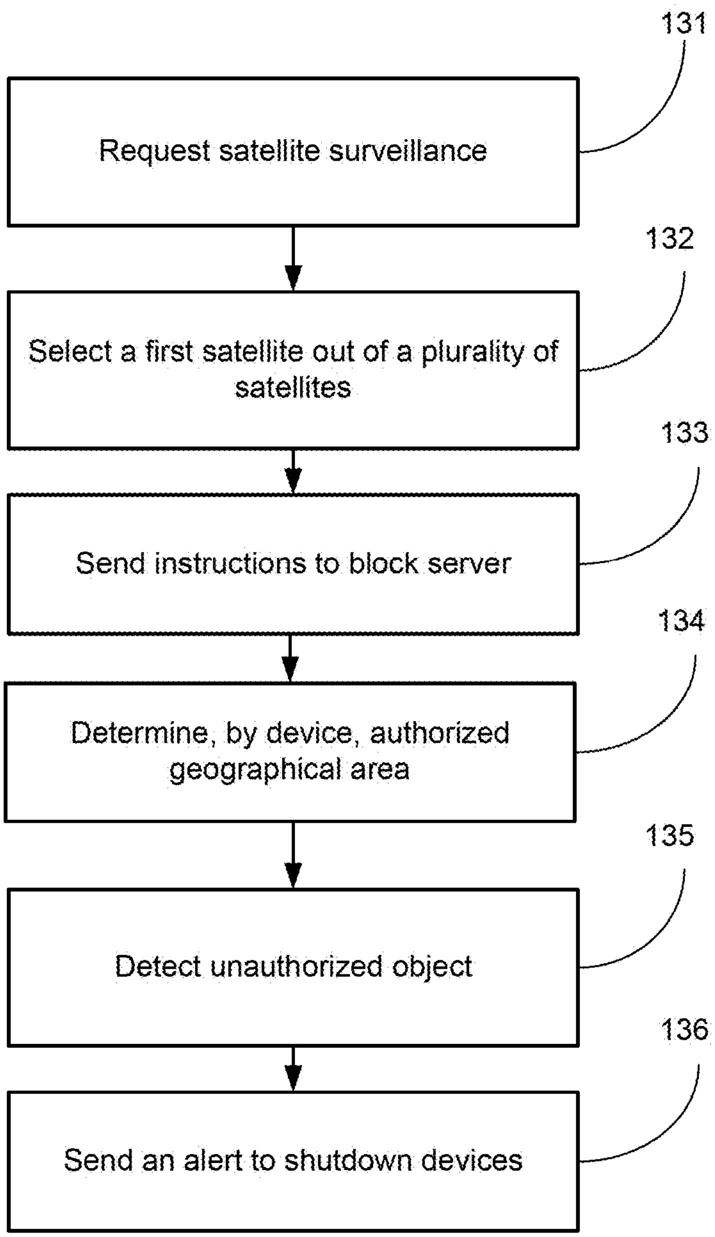
FIG. 3 illustrates an exemplary method that may enabling geofences using satellite systems.

FIG. 3 illustrates an exemplary method that may enable the geofencing system disclosed herein. At step 131, a request for satellite surveillance at a location may be received. The location may be a business, a home, or another area, which may be indicated by coordinates, an address, or the like. The request may be from a mobile device of a user associated with the business, home, or other area. The request may include surveillance related information, such as type of building at the location, type of terrain at the location, list of authorized objects (e.g., persons, animals, or things), list of unauthorized objects, number of objects allowed within geofence (e.g., only 2 vehicles or other objects of a certain type), desired satellite features (e.g., imaging resolution, computation power, availability, or the like), types of alerts to be sent, or when alerts may be sent, among other things.

At step 132, based on the request of step 131, satellite 102 may be selected. For example, surveillance server 101 may determine that satellite 102 is the closest, capable of moving to such location within a time frame, has the sensors for surveilling the location, or the like.

At step 133, instructions may be sent, based on the request of step 131, to block server 103 to indicate a no-go zone for the geographical location associated with geofence 118.

At step 134, a device, such as vehicle 117, may check (e.g., periodically) block server 103 to determine authorized geographical areas for the devices to be located in or near geofence 118. Vehicle 117 may check local storage on the device or remote storage (e.g., block server 103) for the no-go zone information. Alternatively, satellite 102 or block 103 may send alerts to devices as they approach (e.g., within 1 mile) geofence 118. Generally, updates of the no-go zone for vehicle 117 may be updated periodically based on location of vehicle 117, speed of vehicle 117, direction of travel of vehicle 117, or the like. When vehicle 117 determines that it is approaching geofence 118 as an unauthorized vehicle, vehicle 117 may send an alert to its display of another route to avoid geofence 118 or automatically change its route to avoid geofence 118.

At step 135, an unauthorized object may be detected within the geofence 118. In an exemplary scenario, vehicle 116 or vehicle 112 may be considered unauthorized objects that are detected.

At step 136, in response to detecting the unauthorized object, an alert may be sent. The alert may be sent to disable or shut down the device or restrict the functions of the device, such as vehicle 116 or vehicle 112.

It is contemplated that the disclosed subject matter may be used in the context of shipping packages. For example, consider packaging scenarios in which the user does not want certain sizes or types of packages sent/received/left during a period of the activated geofence 118. There may be message sent to delivery drivers (or drones) enroute or a business selling the package (before shipping) during the activation of the geofence 118 in which the package or vehicles fits the unauthorized vehicle parameters.

Although satellite systems are disclosed herein, it is contemplated that some of the subject matter may be implemented without the use of satellite technology in the manner described. The disclosed subject matter may be used for different scenarios, such as detecting looters during evacuation, creating a different geofence around property based on the type of insurance, monitoring homes while a family has indicated they are on vacation, monitoring businesses based on the type of business, or ensuring all expected members are out of household during evacuation, among other things. The disclosed system may use satellite-detectable tags on items at the property (especially valuable items) which may assist with monitoring the item and determining which action to execute. The disclosed subject matter may be used for general security of a location or specific tailored security, particularly during periods where sensitive transactions scenarios are taking place.

The present disclosure is directed to enabling geofences using satellite systems. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth. In addition, the use of the word "of" is generally used inclusively unless otherwise provided herein.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 105 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 100, or portions thereof, may be stored in a remote memory storage device such as storage medium. Computing devices may communicate over network 106 through one or more communications links formed between data interfaces. Communication links may comprise either wired or wireless links. It is to be appreciated that the illustrated network connections in the figures (e.g., FIG. 1 or FIG. 4) are exemplary and other ways of establishing a communications link between multiple devices may be used.

Figure 4:
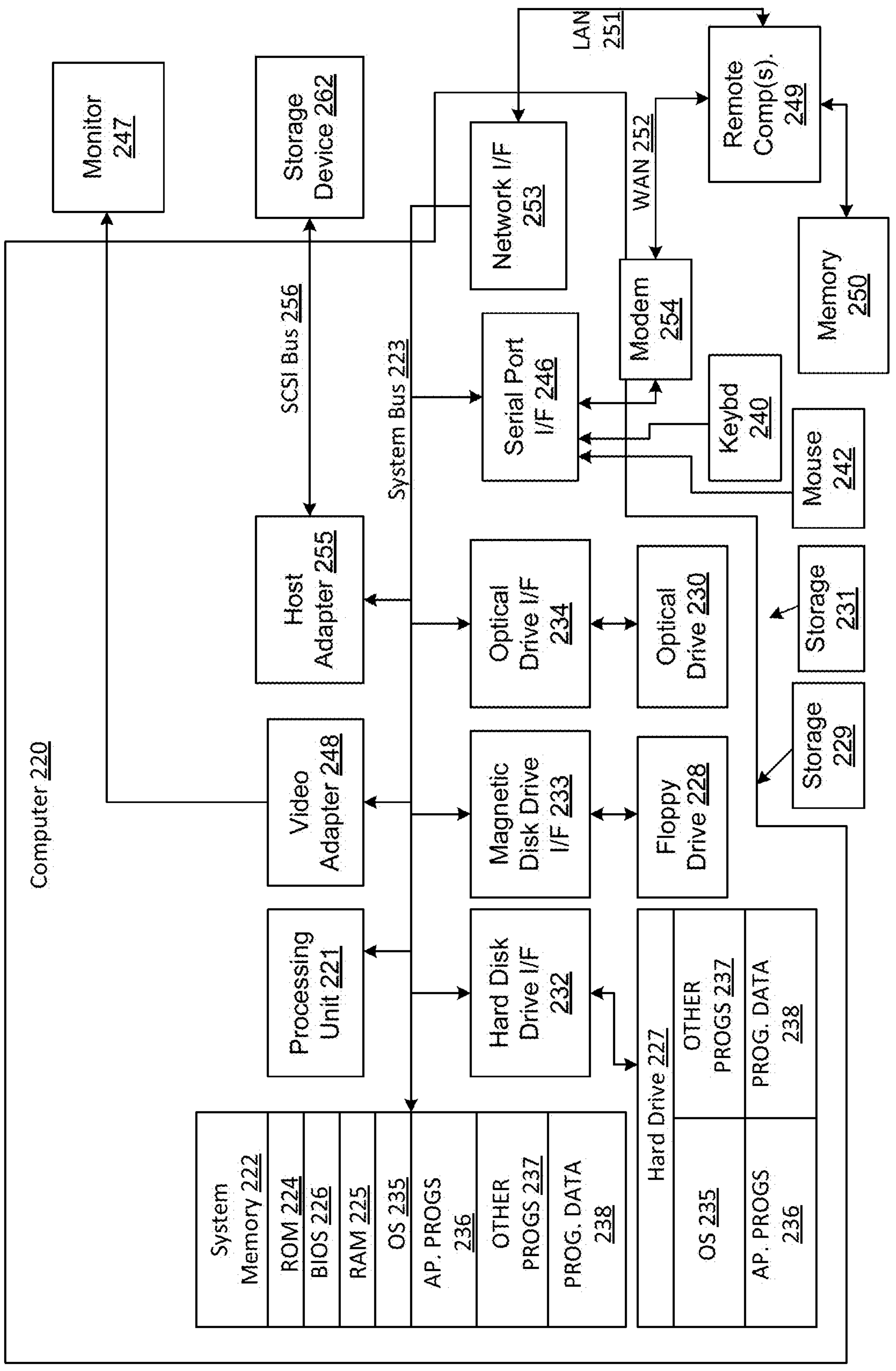
FIG. 4 is an exemplary block diagram representing a computer system in which aspects of the methods and systems disclosed herein or portions thereof may be incorporated.

FIG. 4 and the following discussion are intended to provide a brief general description of a suitable computing environment in which the methods and systems disclosed herein, or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips, or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices. It is contemplated that the disclosed steps associated with different Figures may be combined. Also, the steps may be distributed over multiple devices or performed primarily on one device.

FIG. 4 is a block diagram representing a computer system in which aspects of the methods and systems disclosed herein and/or portions thereof may be incorporated. As shown, the exemplary general purpose computing system includes a computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random-access memory (RAM) 225. A basic input/output system 226 (BIOS), containing the basic routines that help to transfer information between elements within the computer 220, such as during start-up, is stored in ROM 224.

The computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the computer 220. As described herein, computer-readable media is a tangible, physical, and concrete article of manufacture and thus not a signal per se.

Although the exemplary environment described herein employs a hard disk, a removable magnetic disk 229, and a removable optical disk 231, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random-access memory (RAM), a read-only memory (ROM), and the like.

A number of program modules may be stored on the hard disk, magnetic disk 229, optical disk 231, ROM 224 or RAM 225, including an operating system 235, one or more application programs 236, other program modules 237 and program data 238. A user may enter commands and information into the computer 220 through input devices such as a keyboard 240 and pointing device 242. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a computer may include other peripheral output devices (not shown), such as speakers and printers. The exemplary system of FIG. 4 also includes a host adapter 255, a Small Computer System Interface (SCSI) bus 256, and an external storage device 262 connected to the SCSI bus 256.

The computer 220 may operate in a networked environment using logical connections to one or more remote computers, such as a remote computer 249. The remote computer 249 may be a personal computer, a server, a router, a network PC, a peer device or other common network node, and may include many or all of the elements described above relative to the computer 220, although only a memory storage device 250 has been illustrated in FIG. 4. The logical connections depicted in FIG. 4 include a local area network (LAN) 251 and a wide area network (WAN) 252. Such networking environments are commonplace in offices, enterprise-wide computer networks, intranets, and the Internet.

When used in a LAN networking environment, the computer 220 is connected to the LAN 251 through a network interface or adapter 253. When used in a WAN networking environment, the computer 220 may include a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

Computer 220 may include a variety of computer readable storage media. Computer readable storage media can be any available media that can be accessed by computer 220 and includes both volatile and nonvolatile media, removable and non-removable media. By way of example, and not limitation, computer readable media may comprise computer storage media and communication media. Computer storage media include both volatile and nonvolatile, removable, and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 220. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for enabling geofences using satellite systems. A method, system, computer readable storage medium, or apparatus may provide for receiving an indication for satellite surveillance at a location; based on the indication, determining a first satellite of a plurality of satellites that have the appropriate features and location (e.g., is it at location or nearest to location and capability to move to such location); creating a geofence for the location; sending instructions for the first satellite to monitor the geofence of the location; detecting an unauthorized object within the geofence; and in response to detecting the unauthorized object, sending an alert. The indication may be in response to a message to secure a premise, wherein the message to secure a premise may be based on location of UE associated with a user, wherein the UE is a mobile phone, laptop, or vehicle. The object may be a living thing (e.g., person, bear, coyote). The alert may be sent to unauthorized unmanned (or autonomous) vehicles within the geofence. The alert may be disable or shutdown some or all functionality of an unauthorized device. In response to the alert, an indication that the unauthorized object is disabled may be received. A message may be sent to only authorize certain unmanned (or autonomous) vehicles within the geofence. All combinations in this paragraph (including the removal or addition of steps) are contemplated in a manner that is consistent with the other portions of the detailed description.

What is claimed is:

1. A system comprising:

memory coupled with a processor, the memory storing executable instructions that when executed by the processor cause the processor to effectuate operations comprising:

receiving a request for surveillance of an object, wherein a satellite-detectable tag is operatively coupled with the object;

in response to the request, determining a satellite of a plurality of satellites based on a current location of the satellite and a time required for the satellite to move from the current location to a surveillance location, wherein the satellite can perform the surveillance of the object from the surveillance location;

sending instructions for the satellite to monitor at least the satellite-detectable tag;

detecting, at least in part using information collected by the satellite during the monitoring of the satellite-detectable tag, an action involving the object; and in response to detecting the action, sending an alert to a device of a party associated with the object.

2. The system of claim 1, wherein the operations comprise:

sending instructions to the satellite to move from the current location to the surveillance location.

3. The system of claim 1, wherein the alert triggers deployment of an unmanned vehicle or autonomous vehicle.

4. The system of claim 1, wherein the alert is sent to a device of a public safety authority.

5. The system of claim 1, wherein the operations comprise:

detecting, at least in part using information collected by the satellite during the surveillance, an unauthorized object in a vicinity of the object, wherein the action includes detecting the unauthorized object.

6. The system of claim 5, wherein the unauthorized object is a vehicle.

7. The system of claim 1, wherein the object is within a geofence subject to the surveillance.

8. A method comprising:

receiving a request for surveillance of an object, wherein a satellite-detectable tag is operatively coupled with the object;

in response to the request, determining a satellite of a plurality of satellites based on a current location of the satellite and a time required for the satellite to move from the current location to a surveillance location, wherein the satellite can perform the surveillance of the object from the surveillance location;

sending instructions for the satellite to monitor at least the satellite-detectable tag;

detecting, at least in part using information collected by the satellite during the monitoring of the satellite-detectable tag, an action involving the object; and in response to detecting the action, sending an alert to a device of a party associated with the object.

9. The method of claim 8, comprising:

sending instructions to the satellite to move from the current location to the surveillance location.

10. The method of claim 8, wherein the alert triggers deployment of an unmanned vehicle or autonomous vehicle.

11. The method of claim 8, wherein the alert is sent to a device of a public safety authority.

12. The method of claim 8, comprising:

detecting, at least in part using information collected by the satellite during the surveillance, an unauthorized object in a vicinity of the object, wherein the action includes detecting the unauthorized object.

13. The method of claim 12, wherein the unauthorized object is a vehicle.

14. The method of claim 8, wherein the object is within a geofence subject to the surveillance.

15. A non-transitory computer readable storage medium storing computer executable instructions that when executed by a computing device cause said computing device to effectuate operations comprising:

receiving a request for surveillance of an object, wherein a satellite-detectable tag is operatively coupled with the object;

in response to the request, determining a satellite of a plurality of satellites based on a current location of the satellite and a time required for the satellite to move from the current location to a surveillance location, wherein the satellite can perform the surveillance of the object from the surveillance location;

sending instructions for the satellite to monitor at least the satellite-detectable tag;

detecting, at least in part using information collected by the satellite during the monitoring of the satellite-detectable tag, an action involving the object; and in response to detecting the action, sending an alert to a device of a party associated with the object.

16. The non-transitory computer readable storage medium of claim 15, wherein the operations comprise:

sending instructions to the satellite to move from the current location to the surveillance location.

17. The non-transitory computer readable storage medium of claim 15, wherein the alert triggers deployment of an unmanned vehicle or autonomous vehicle.

18. The non-transitory computer readable storage medium of claim 15, wherein the alert is sent to a device of a public safety authority.

19. The non-transitory computer readable storage medium of claim 15, wherein the operations comprise:

detecting, at least in part using information collected by the satellite during the surveillance, an unauthorized object in a vicinity of the object, wherein the action includes detecting the unauthorized object.

20. The non-transitory computer readable storage medium of claim 19, wherein the unauthorized object is a vehicle.

* * * * *